United States Patent Office 3,352,824
Patented Nov. 14, 1967

3,352,824
STABILIZED POLYMERS OF ALKYLENE OXIDES
Otto Mauz, Frankfurt am Main, and Hasso Hertel, Offenbach (Main), Germany, assignor to Farbwerke Hoechst Aktiengesellschaft vormals Meister Lucius & Bruning, Frankfurt am Main, Germany, a corporation of Germany
No Drawing. Filed June 22, 1965, Ser. No. 466,095
Claims priority, application Germany, June 24, 1964, F 43,252
4 Claims. (Cl. 260—45.75)

ABSTRACT OF THE DISCLOSURE

Stabilized polyalkylene oxide polymers containing aromatic amines or phenols or a mixture of (i) a nickel complex of a benztriazole, (ii) bis-(4 hydroxy-2-lower alkyl-5 tertiary butyl-phenyl) sulfide or methane and (iii) an alkyl sulfide compound.

The present invention relates to stabilized polymers of alkylene oxides and to a process for preparing same.

It is known that homopolymers and copolymers of alkylene oxides, like all polyethers, undergo degradation to varying extents in the presence of light and atmospheric oxygen so that they have to be stabilized before they are further processed or used. It is known that aromatic amines or phenols can be used as stabilizers for polypropylene oxide, for example. However, the action of such stabilizers does not suffice to inhibit degradation in the presence of light and heat.

Now we have found that very good stabilization of polymers of alkylene oxides against degradation under the action of light and heat can be achieved when they are intimately mixed with a stabilizer system consisting of compounds of the following formulae:

(a) Nickel complexes of compounds of the formula

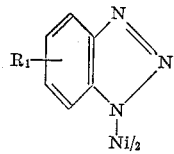

(b)

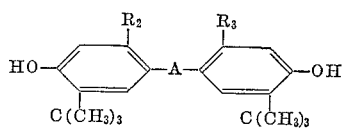

(c) 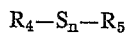

In the formulae $R_1$ represents a hydrogen- or a halogen atom, an alkyl-, aryl-, aralkyl-, cycloalkyl, alkoxy-, aryloxy-, acyloxy-, nitro-, amino-, alkylamino-, dialkylamino-, arylamino-, acylamino-, sulfonylamino-, cyano-, acyl-, carboxylic acid ester-, if necessary a substituted carboxylic acid amide-, sulfonic acid ester-, if necessary a substituted sulfonic acid amide-, alkyl sulfonic- or aryl sulfonic group: A represents an —S— group or —(CH$_2$)— group, preferably an —S— group, $R_2$ and $R_3$ represents the same or different alkyl radicals containing 1 to 4 carbon atoms, preferably an alkyl radical containing 1 carbon atom; $n$ is an integer within the range of 1 to 4; $R_4$ and $R_5$ represent the same or different alkyl radicals containing, for example, 4 to 30, preferably 8 to 20 carbon atoms or the group —(CH$_2$)$_m$—COO.R$_6$, R$_6$ representing an alkyl radical containing, for example, 4 to 30 carbon atoms, and $m$ is an integer within the range of 1 to 4. The stabilizer system contains in general 0.1 to 5 percent by weight of one or several compounds of the general Formula $a$, and 0.01 to 5 percent by weight, respectively, of one or several compounds of the general Formula $b$ and $c$, all percentages being calculated on the polymer.

As compounds of the general Formula $a$, there are mentioned, for example, nickel compounds obtained by reacting arylen-1,2,3-triazoles, which contain a hydrogen atom in the triazole ring, with compounds yielding nickel:

nickel complex of 1,2,3-benztriazole
nickel complex of 6-methyl-benztriazole
nickel complex of 6-chloro-benztriazole
nickel complex of 6-methoxy-benztriazole
nickel complex of 5-acetylamino-1,2,3-benztriazole
nickel complex of 5-butyroylamino-1,2,3-benztriazole
nickel complex of 6-stearoylamino-1,2,3-benztriazole
nickel complex of 6-benzoylamino-1,2,3-benztriazole.

Exemplary of the compounds of the general Formula $b$ are:

bis(4-hydroxy-2-methyl-5-tert.butyl-phenyl-)methane
bis(4-hydroxy-2-propyl-5-tert.butyl-phenyl-)methane
bis(4-hydroxy-2,5-di-tert.butyl-phenyl-)methane
bis(4-hydroxy-2-methyl-5-tert.butyl-phenyl-)sulfide
bis(4-hydroxy-2-propyl-5-tert.butyl-phenyl)sulfide
bis(4-hydroxy-2,5-di-tert.butyl-phenyl-)sulfide.

As organic sulfur compounds of the general Formula $c$ there may be used: di(dodecyl)sulfide, di(octadecyl)sulfide, di(dodecyl)disulfide, di(octadecyl)disulfide, di(dodecyl)trisulfide, di(octadecyl)trisulfide, di(dodecyl)-tertrasulfide, di(octadecyl)tetrasulfide, thiodiglycollic acid dodecyl ester, thiodipropionic acid octadecyl ester, thiodibutyric acid dodecyl ester, trisulfide(diacetic acid octadecyl ester), tetrasulfide(diacetic acid octadecyl ester), and the like.

As polymers which can be stabilized according to the invention, there may be mentioned homopolymers and copolymers of alkylene oxides. The homopolymers and copolymers can be prepared in the presence of a known ionic catalyst by polymerization of saturated alkylene oxides, for example ethylene oxide, propylene oxide; substituted epoxides, for example, epichlorohydrine, perfluoropropylene oxide and 1-chloro-3,4-epoxybutane; cycloaliphatic epoxides, for example cyclohexene oxide; or epoxy ethers, for example, methyl glycidyl ether and phenyl glycidyl ether. The copolymers are prepared in analogous manner by copolymerization of unsaturated epoxides with saturated epoxides, for example, allyl glycidyl ether, o-allylphenyl glycidyl ether, glycidyl acrylate, vinyl cylohexene monoepoxide, cyclohexene oxide, butadiene monoxide, 1,2-epoxyhexene-5, 1,2-epoxycyclooctene-(5). The polymers of alkylene oxides which have been stabilized according to the invention afford a wide range of application, for example in the manufacture of shaped articles, films and fibers.

The homopolymers or copolymers mentioned above may also be dissolved or swollen in appropriate solvents or swelling agents in which case the solutions or swellings have a solids content of about 20 to 30 percent. Suitable solvents or swelling agents are, for example: dimethyl formamide, tetramethylene-sulfone, dioxane, methanol, benzene and other aromatic substances, moreover chlorohydrocarbons, as well as mixtures containing two or three of the said solvents or swelling agents.

Compounds which have a cross-linking action may be added to the solutions or swellings of the copolymers obtained from saturated and unsaturated epoxides, which have been stabilized according to the invention. As cross-linking compounds there are suitable not only sulfur-accelerator systems but also organic peroxides and other substances forming radicals under the cross-linking conditions, for example azodiisobutyric acid nitrile or azodicarboxylic acid diamides.

It is also possible to add further additives to the solutions or swellings of the polymers stabilized according to the invention, such as active or inactive carbon blacks or light-colored filling material, dyestuffs or pigments extender oils and lubricants.

The following example serves to illustrate the invention but it is not intended to limit it thereto. In order to test the stability of the polyalkylene oxides stabilized according to the invention, tht following procedure was used:

*Example 1*

A mixture was prepared on a roller mill (temperature of the rolls: about 40° C.) with the use of a copolymer consisting of 92.5 mol percent propylene oxide and 7.5 mol percent allylglycidyl ether, which mixture had the following composition:

| | Parts by wt. |
|---|---|
| Copolymer | 100.0 |
| Thiourea | 1.0 |
| Silicic acid, active | 15.0 |
| Zinc oxide | 7.5 |
| Dipentamethylene-thiuram tetrasulfide | 5.0 |
| 2-mercaptobenzothiazole | 0.75 |
| Kronos white | 3.0 |
| | 132.25 |

100 parts by weight of this mixture were dissolved or made into a paste in 400 parts by weight of methanol, and a mixture was added thereto which consisted of 2% by weight of the compounds enumerated in the table according to the general Formula $a$, as well as 0.5% by weight of bis-(4-hydroxy-5-tert.butyl-2-methyl-phenyl)-sulfide and 0.5% by weight of di-(octadecyl)-disulfide as heat stabilizers. This solution or gel was spun with the use of water as precipitating bath liquid under the following conditions and cross-linked in a heated shaft:

| | |
|---|---|
| Spinning temperature | 20° C. |
| Amount conveyed | 0.2 g./min. |
| Nozzle | 6/300μ. |
| Titer | 6/200 deniers. |
| Temperature of the precipitating bath | 20° C. |
| Residence time in the precipitating bath | 60 seconds. |
| Cross-linking temperature | 160° C. |
| Duration of the cross-linking in a heated shaft | 60 seconds. |
| Draw-off speed | 5 m./min. |
| After-vulcanization on the bobbin | 120 sec./160° C. hot-air. |

For carrying out the tests, the following four stabilizers were used:

(a) 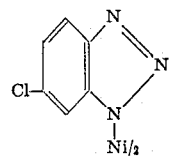

(b) 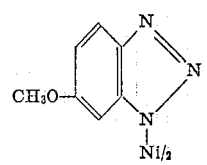

(c) 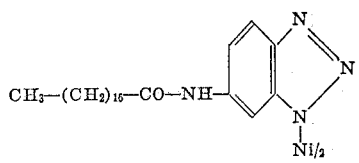

(d) 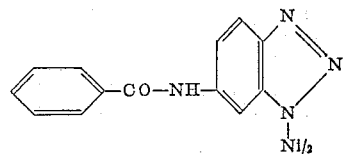

After exposure to a Xenotest rapid lamp for 100 hours, the fibers had the properties shown in the following table:

| | Containing no compound according to the general Formula (a) | Compounds according to the general Formula (a) (percent) | | | |
|---|---|---|---|---|---|
| | | (a) | (b) | (c) | (d) |
| Relative residual tensile strength in percent of the initial tensile strength after 100 hours' exposure to the Xenotest rapid lamp.[1] | Material got brittle, no longer measurable. | 35 | 30 | 38 | 27 |
| Relative residual elongation in percent of the initial elongation after 100 hours' exposure to the Xenotest rapid lamp.[1] | ____do____ | 56 | 48 | 60 | 47 |

[1] Temperature 45° C., relative air humidity 30%.

We claim:

1. A composition of matter comprising a polymer of an alkylene oxide and a mixture comprising 0.1 to 5 percent by weight of at least one compound of Formula $a$, 0.01 to 5 percent by weight of at least one compound of Formula $b$, and 0.01 to 5 percent by weight of at least one compound of Formula $c$, all percentages being calculated on the polymer, (a) 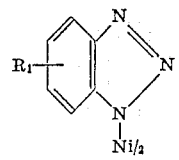

(b) 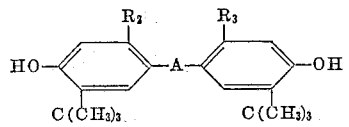

(c) 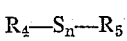

in the formulae $R_1$ represents a member selected from the group consisting of a hydrogen atom, a halogen atom, an alkyl-, alkoxy-, and acylamine group; A represents a member selected from the group consisting of an —S— group and a —($CH_2$)—group, $R_2$ and $R_3$ represent alkyl radicals containing 1 to 4 carbon atoms; $n$ is an integer within the range of 1 to 4; $R_4$ and $R_5$ represent a member selected from the group consisting of alkyl radicals containing 4 to 30 carbon atoms and the group —($CH_2$)$_m$—COO.$R_6$ $R_6$ representing an alkyl radical containing 4 to 30 carbon atoms, and $m$ is an integer within the range of 1 to 4.

2. The composition as claimed in claim 1, wherein A is an —S—group.

3. The composition as claimed in claim 1, wherein $R_2$ and $R_2$ represent the alkyl radical containing one carbon atom.

4. The composition as claimed in claim 1, wherein $R_4$ and $R_5$ represent alkyl radicals containing 8 to 20 carbon atoms.

References Cited

UNITED STATES PATENTS

| 3,074,909 | 1/1963 | Matlack | 260—45.75 |
| 3,212,058 | 10/1965 | Boyle | 260—47 |
| 3,219,623 | 11/1965 | Berardinelli | 260—45.95 |
| 3,277,044 | 10/1966 | Weissermel et al. | 260—45.8 |

FOREIGN PATENTS

| 831,925 | 4/1960 | Great Britain. |

DONALD E. CZAJA, *Primary Examiner.*

V. P. HOKE, *Assistant Examiner.*